United States Patent Office 3,401,252
Patented Sept. 10, 1968

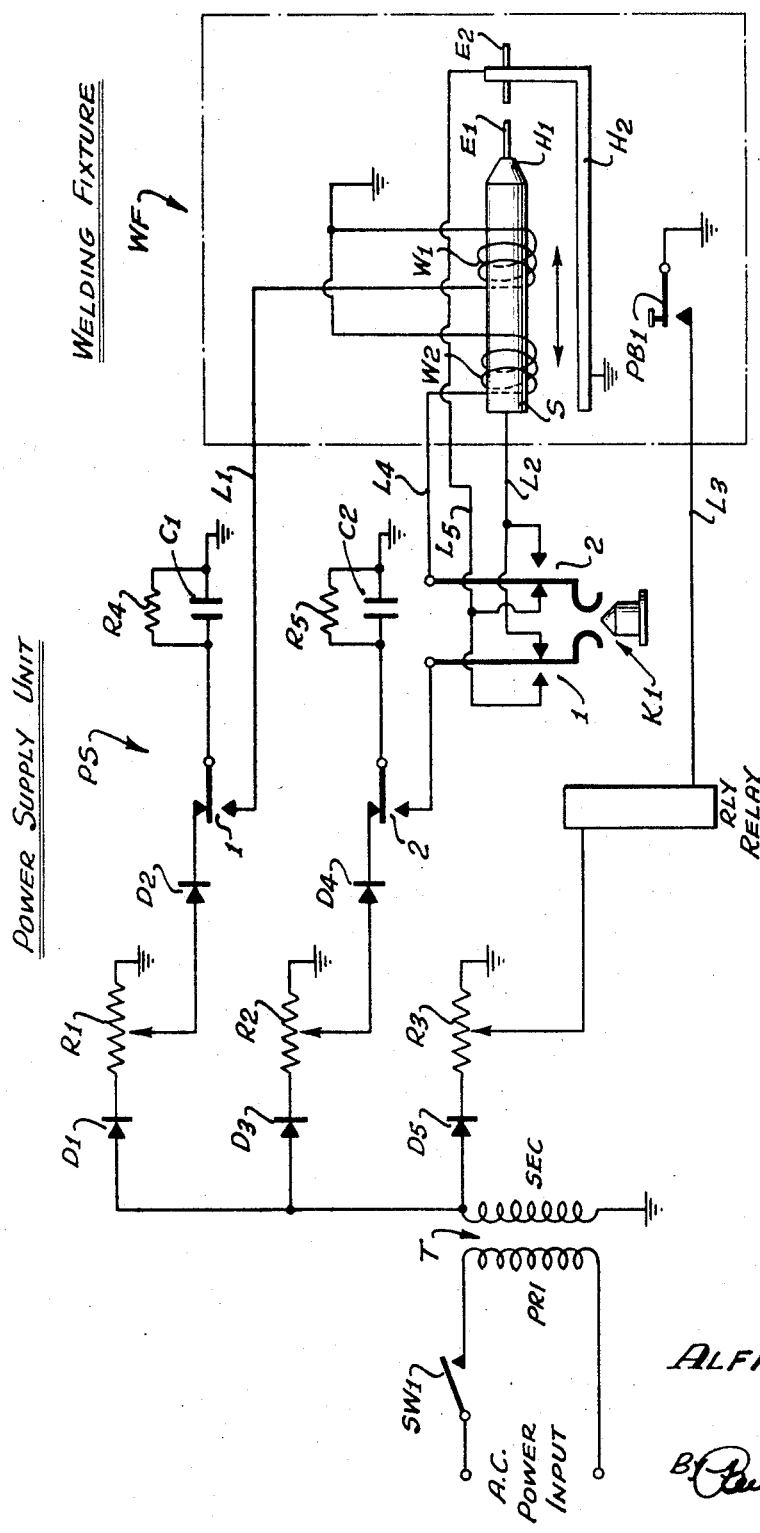

3,401,252
DUAL-ENERGY PERCUSSIVE ARC WELDING SYSTEM AND DUAL WINDING FIXTURE THEREFOR
Alfred R. Erbe, Santa Ana, Calif., assignor, by mesne assignments, to The Sippican Corporation, Marion, Mass., a corporation of Massachusetts
Filed Mar. 18, 1965, Ser. No. 440,759
5 Claims. (Cl. 219—95)

ABSTRACT OF THE DISCLOSURE

A percussive welding device is provided with a movable holder carried by a movable solenoid. The motion of the solenoid is controlled by two windings arranged thereon. The first winding is energized by a source of energy, to move the movable holder towards a fixed holder. The second winding is energized by the welding current to augment the flux produced by the first winding and thereby increase the impact force of the welding elements.

---

This invention relates in general to arc welding apparatus and in particular to arc-percussive welding systems of the type in which the ends of electrodes or weldments are melted by an arc established therebetween and are forcibly driven together to provide a forged connection. Its principal object is to provide a welding system of the above character which provides improved welded connections.

Specifically, the invention is directed toward a welding system utilizing a "welding gun" in the form of a portable hand tool which receives the welding current and forging energy from an associated power supply. An example of such a gun and power supply is shown in the copending application of T. W. Conrad, Ser. No. 359,025, filed Apr. 13, 1964, and entitled, "Welding Accessory."

In the noted T. W. Conrad application, the weldments are spaced apart a predetermined distance and operation of a switch on the welding accessory causes a welding pulse to be generated which establishes an arc between the weldments causing the ends thereof to melt. The resulting welding current is arranged to pass through the winding of a solenoid carrying one of the weldments and cause the two weldments to forcibly be driven together. A characteristic of this system is that the speed and consequent impact force of the solenoid is a function of the welding current which necessarily must be of a magnitude and duration suitable for the size and type of material used in the weldments. Accordingly, the speed and force of the solenoid for a particular type of material may be too great and cause distortion of the weldment or may be too little and not provide a proper forged connection.

In the copending application of J. E. Cordner, entitled, "Dual Energy Percussive Arc Welding System," and filed on even date herewith, an improvement on the noted T. W. Conrad arrangement is disclosed wherein the speed and force of the solenoid is independent of the welding current.

It has been found that under certain conditions wherein a large forging force is required, the speed of the solenoid was increased so much that occasionally the weldments were moved into mechanical contact before an arc was established or before sufficient burn back occurred on the weldments. Accordingly, it is an object of this invention to provide a welding system and associated welding fixture which is reliable in providing an arc under conditions of high impact forging.

It is another object of this invention to provide a solenoid arrangement in which movement of one of the weldments toward the other is relatively slow until an arc is established, at which time the movement of the solenoid is suddenly and substantially increased.

A feature concerned with carrying out the above object resides in the provision of two windings on the solenoid, one energized by a first source of energy and the other energized by the welding current.

Another object is to provide a system of the above character wherein the speed and consequent impact force of both the first and second solenoid movements are separately adjustable.

In some instances, it is desirable to change the connection of the welding current source from one weldment to the other to change one weldment from acting as an anode to act as a cathode for improved welding connections. However, if such reversal is accomplished by switching the connections from the welding current source from the moving element to the fixed element, the noted winding that is energized by the welding current opposes the winding which imparts initial movement to the solenoid. Accordingly, it is still another object of this invention to provide switching means in the power supply which electrically reverses the electrode connection to the welding current without reversing the direction of flux of the welding current winding.

Other objects and features of the invention will be best understood when the specification and claims are read in conjunction with the accompanying drawing in which a schematic diagram of a dual energy power supply and a diagrammatic view of a welding fixture or gun are shown.

The welding system comprises a power supply unit PS connected to a commercial source of power, for example, and a welding fixture WF associated with the power supply unit PS by leads L1 to L5. The power supply unit PS and welding fixture WS have a common ground return.

The power supply unit PS includes a pair of storage capacitors C1 and C2 which may be separately and selectively controlled to assume a desired charge; one capacitor being associated with the electrode or weldment holder of the welding fixture WF and the other capacitor being associated with the winding of a solenoid S which carried another weldment holder. A relay RLY in the power supply unit, controlled by a push button or switch PB1 on the welding fixture WF, connects the two capacitors C1 and C2 to their respective components in the fixture WF, causing an arc to be established between the weldments and thereafter causing the weldments to be forcibly driven together.

The system will not be described in detail.

When the power switch SW1 is operated, 120 volts, 60 cycles, for example, is applied to the primary PR1 of transformer T, inducing an RMS voltage of 120 volts in the secondary SEC, which is applied to each of the half-wave rectifiers D1, D3 and D5.

The circuit components are so selected that a direct current voltage of approximately 170 volts is supplied to the solenoid control potentiometer R1. A charging voltage from the wiper arm of potentiometer R1 is supplied to the solenoid storage capacitor C1 through the steering diode D2 and normally closed contacts 1 of unoperated relay RLY. The precise charge on capacitor C1 is controlled by the setting of the solenoid control potentiometer R1.

A similar circuit, consisting of weld voltage control potentiometer R2, causes capacitor C2 to be charged through steering diode D4 and normally closed contacts 2 of relay RLY. The magnitude of the charge is controlled by the setting of the wiper arm on potentiometer R2.

The capacitors C1 and C2 are connected to the moving contact elements of contact sets 1 and 2, respectively, of relay RLY and the normally open contact elements are connected directly to lead L1 and through the reversing key K1 to leads L2 or L5 extending to the welding fixture.

A voltage from the secondary SEC of transformer T is rectified by diode D5 and appears on one side of the winding of relay RLY through relay control potentiometer R3. The other side of the winding of the relay RLY extends to the welding fixture WF over lead L3.

The contact sets on relay RLY are adjusted so that make contacts 2 close before make contacts 1 in order to insure that lead L2 or lead L5 has a potential thereon prior to the placing of a potential on lead L1.

The welding fixture comprises a gun structure similar to that disclosed in the noted copending application of T. W. Conrad but is shown here in diagrammatic form for purposes of clarity. The weldment holder H2 is a fixed element supporting, for axial movement, a movable solenoid core S which includes a weldment holder H1. A first solenoid winding W1 encircles the solenoid core S and imparts to the core, a forward movement to the right when the winding W1 is energized. A second solenoid winding W2 also encircles the solenoid core S and when energized imparts an additional driving force to the core S in the same direction as imparted by winding W1. The circuit for winding W2 is from ground through the winding and over lead L4 to either lead L5 or lead L2 depending on the position of key K1. A return spring or suitable means, not shown, returns the core S to its illustrated position when the windings W1 and W2 are de-energized. The winding W1 has one end connected to ground and the other end connected to the lead L1. The winding W2 has one end connected to lead L4 and the other end connected to ground.

The holder H1 is arranged to receive and fixedly hold a weldment E1 while holder H2 is arranged to receive and fixedly hold a weldment E2 which is to be welded to weldment E1.

A push button switch or key PB1 is provided on the welding fixture and is arranged to connect ground potential to lead L3 when the push button PB1 is operated.

The operation of the system in forging weldment E1 to weldment E2 will now be described.

After the operator places the weldments E1 and E2 in respective holders H1 and H2 and the power supply unit PS has stored a desired charge on capacitors C1 and C2, the operator depresses push button PB1 to place a ground potential on one side of the winding of relay RLY over lead L3. Since a direct current voltage is present on the other end of the relay winding, relay RLY is energized. The weldments E1 and E2 are spaced apart sufficiently to prevent any arcing until the solenoid core S is moved.

Relay RLY operates and, as above noted, closes its contact set 2 a short time before contact set 1 is closed.

With the reversing key K1 in its illustrated position, the voltage across capacitor C2 appears on weldment E1 but due to the spacing of weldment E1 from weldment E2, no current flows at this time, and winding W2 is not energized. Shortly thereafter, when make contacts 1 are closed, capacitor C1 starts to discharge through the winding W1 of the solenoid, causing solenoid core S and the weldment E1 to move toward weldment E2 at a velocity and speed determined by the charge on capacitor C1 and by the electrical and mechanical characteristics of the welding fixture, which is at a rate that insures the establishment of an arc before any mechanical contact is established between the weldments.

As weldment E1 approaches weldment E2, the potential appearing therebetween from the charge on capacitor C2 causes an arc to be established, resulting in the melting of the weldment ends of the weldments E1 and E2. At the time of the arc, these weldments are approaching each other under control of winding W1 but as welding current flows, winding W2 is energized providing an addition forward thrust on the solenoid core S. The operate circuit is from ground, through winding W2, over lead L4, through break contacts 2 of key K1, over lead L5, through holder H2 and element E2, across the established arc, over lead L2 and through break contacts 1 of key K1 to capacitor C2.

When the capacitors C1 and C2 have discharged, welding current and solenoid actuation ceases. The push button PB1 is released and relay RLY is restored. The weldments E1 and E2 may be removed from their respective holders. The core S returns to its illustrated position.

After relay RLY restores, a charging circuit is again established for capacitors C1 and C2 in preparation for welding new elements E1 and E2.

If a higher arcing potential is desired for providing a faster burn back or greater secondary impacting force, the potentiometer R2 is correspondingly adjusted. If a greater initial speed of movement of the solenoid core is desired, potentiometer R1 is correspondingly adjusted.

It will be noted that capacitor C2 becomes connected to the break contacts 1 of reversing key K1 and to weldment E1 when relay RLY is energized. At the same time, winding W2 is connected from ground to element E2 through contacts on the key K1. The arc between elements E1 and E2 pass an energizing current in a given direction to winding W2. When key K1 is in its illustrated position, weldment E2 serves as a cathode and weldment E1 serves as an anode. If the weldment material is such that a better weld connection is accomplished by having weldment E2 serve as the cathode, then reversing key K1 is operated and contacts thereon connect the output of capacitor C2 to weldment E2 as a cathode and the winding W2 to element E1 as an anode. Welding current now passes through winding W2 in the same direction as before when key K1 was unoperated.

While I have disclosed my invention in conjunction with specific apparatus, it is to be understood that numerous other embodiments could be employed without departing from the spirit of my invention.

What I claim is:

1. A percussive arc welding system comprising a power supply having first and second energy sources, a welding fixture interconnected with said energy sources including means for supporting a pair of workpiece electrodes to be welded together, a fixed holder for supporting one of said electrodes and an electromagnetically operated movable holder for supporting the other of said electrodes, first and second windings arranged about and in flux linking relationship with said movable holder and electrically insulated therefrom and from each other, and means for connecting said second energy source in series circuit with said second winding and across said electrodes to establish a potential between said electrodes and means for connecting said first energy source across said first winding to generate a magnetic flux to move said movable holder toward said fixed holder to bring said electrodes into impacting contact, said second energy source constituting means for establishing a welding current arc between said electrodes during said movement of said movable holder, and said welding current producing energizing current in said second winding thereby generating a magnetic flux in said second winding in aiding relationship with the magnetic flux generated by said first winding to thereby constitute means for providing an additional thrust to said movable holder.

2. The percussive arc welding system as set forth in claim 1 wherein first control means are provided for adjusting said potential established between said electrodes and wherein second control means independent of said first control means are provided for controlling the velocity of the movement of said movable holder prior to the said establishment of a welding current arc between said electrodes.

3. The percussive arc welding system as set forth in claim 2, wherein said first and second energy sources comprise separately chargeable capacitance means and wherein said first and second control means constitute means for controlling the charge established on said capacitance means.

4. The percussive arc welding system as set forth in claim 3 wherein one side of the capacitance means of said second energy source is connected to said movable holder through said second winding and the other side thereof is connected to said fixed holder, and further comprising reversing means for reversing the said connections to said electrodes with the direction of generated magnetic flux remaining unchanged.

5. The percussive arc welding system as set forth in claim 1 wherein said first energy source through said first winding constitutes the sole means for controlling the initial movement of said movable holder, and said first and second energy sources through said respective windings together constitute means for controlling the subsequent movement of said moveable holder and the magnitude of said impacting force.

References Cited

UNITED STATES PATENTS

| 3,244,854 | 4/1966 | Bucci et al. | 219—98 |
| 3,254,193 | 5/1966 | Phillips | 219—95 |

RICHARD M. WOOD, *Primary Examiner.*

C. CHADD, *Assistant Examiner.*